United States Patent
Boixadera et al.

(10) Patent No.: US 10,154,448 B2
(45) Date of Patent: Dec. 11, 2018

(54) MULTIMODE MOBILE COMMUNICATION NETWORK SEARCH IN A WIRELESS COMMUNICATION DEVICE

(71) Applicant: MStar Semiconductor, Inc., Hsinchu Hsien (TW)

(72) Inventors: Francesc Boixadera, Cambridge (GB); Cyril Valadon, Letchworth Garden City (GB)

(73) Assignee: MSTAR SEMICONDUCTOR, INC., Hsinchu Hsien (TW)

( * ) Notice: Subject to any disclaimer, the term of this patent is extended or adjusted under 35 U.S.C. 154(b) by 1164 days.

(21) Appl. No.: 14/245,023

(22) Filed: Apr. 4, 2014

(65) Prior Publication Data

US 2015/0289198 A1 Oct. 8, 2015

(51) Int. Cl.
*H04W 48/16* (2009.01)
*H04W 48/18* (2009.01)

(52) U.S. Cl.
CPC ............ *H04W 48/16* (2013.01); *H04W 48/18* (2013.01)

(58) Field of Classification Search
CPC ..... H04W 48/16; H04W 48/18; H04W 36/08; H04W 36/32; H04W 88/06; H04W 48/20; H04W 64/003; H03D 7/1441; H03D 7/165; H03D 2200/0074; H03D 2200/0088; H04B 1/0075; H04B 1/0085; H04L 5/06; H04L 5/143; G01S 19/33; G01S 19/37
See application file for complete search history.

(56) References Cited

U.S. PATENT DOCUMENTS

| | | | | |
|---|---|---|---|---|
| 2010/0091688 | A1* | 4/2010 | Staszewski | H03D 7/1441 370/277 |
| 2012/0026039 | A1* | 2/2012 | Ganeshan | G01S 19/33 342/357.73 |
| 2013/0130724 | A1* | 5/2013 | Kumar Reddy | H04W 36/08 455/456.6 |

FOREIGN PATENT DOCUMENTS

CN 1638520 A 7/2005
WO 20050001503 A2 1/2005

* cited by examiner

*Primary Examiner* — James Yang
(74) *Attorney, Agent, or Firm* — Edell, Shapiro & Finnan, LLC

(57) ABSTRACT

A wireless communication device includes a wireless transceiver to wirelessly receive and transmit radio frequency (RF) signals and sample a signal representative of the received RF signal over a predetermined time period. The receiver stores the sampled signal in a memory. After the predetermined time period, a processor, coupled to the wireless transceiver and the memory, concurrently searches the sampled signal for multiple communication signals each operating according to a corresponding one of multiple, different mobile communication standards. If one of the communication signals is found, the WCD attempts to connect wirelessly with a communication network from which the found communication signal originates.

20 Claims, 7 Drawing Sheets

700

| | 3GPP LTE |
|---|---|
| CHANNEL BANDWIDTH | 1.4, 3, 5, 10, 15, AND 20 MHz |
| DL MULTIPLE ACCESS | OFDMA |
| UL MULTIPLE ACCESS | SC-FDMA |
| DUPLEXING | FDD AND TDD |
| SUBCARRIER MAPPING | LOCALIZED |
| SUBCARRIER HOPPING | YES |
| DATA MODULATION | QPSK, 16QAM, AND 64QAM |
| SUBCARRIER SPACING | 15 KHz |
| FFT SIZE (5 MHz) | 512 |
| CHANNEL CODING | CONVOLUTIONAL CODING AND TURBO CODING. |
| FREQUENCY RASTER | 125 KHz |

FIG.7

MULTIMODE MOBILE COMMUNICATION NETWORK SEARCH IN A WIRELESS COMMUNICATION DEVICE

TECHNICAL FIELD

The present disclosure relates to network search techniques in wireless mobile communication devices.

BACKGROUND

Worldwide, wireless/mobile communication networks operate across a large number of frequency bands and according to many different mobile communication standards or RATs (Radio Access Technologies). A conventional wireless communication device (WCD), such as a smartphone, may be configured to operate with multiple ones of the different standards or RATs. Furthermore, there is no association between the WCD and the frequency band, as in general different WCDs can be used within different carriers of the same band. Different band arrangements for multiple RATs can be allocated by regulators in different countries or regions. Even within a given region, different operators may use a different RAT configuration in each available band, and even the same operator may change this setup over time.

Before communication services may be accessed by the WCD, the WCD must find or acquire an available network with which to connect. In a conventional WCD network search, the WCD selects a frequency band in which to search for a network that operates according to a given network standard, and tunes a receiver of the WCD to a potentially large set or number of candidate carriers of the selected band, where the set depends on the RATs being searched. While the receiver dwells on each of the selected frequency carriers for 5 or 10 milliseconds (ms), the WCD searches specific RF waveforms/signals received in that band for sequential frames of a downlink signal formatted according to each network standard. The WCD sequentially repeats the search process, i.e., dwell and downlink signal search, across all of the possible frequency carriers for each of the different networks (i.e., network standards) within a given band until the WCD finds an available network. The number of allocated bands worldwide is already in excess of 40, and is expected to grow further. The sequential search process is inefficient and time consuming given that there may be hundreds or thousands of search possibilities that are searched in sequence.

SUMMARY

A wireless communication device includes a wireless transceiver to wirelessly receive and transmit radio frequency (RF) signals, and sample a wide bandwidth signal representative of the received RF signal over a predetermined time period. The receiver stores the sampled signal (which may include I and Q samples) in a memory. After the predetermined time period, a processor, coupled to the wireless transceiver and the memory, concurrently searches the sampled signal for multiple communication signals each operating according to a corresponding one of multiple, different mobile communication standards or RATs. If one of the communication signals is found, the WCD attempts to connect wirelessly with a communication network from which the found communication signal originates.

BRIEF DESCRIPTION OF THE DRAWINGS

FIG. 7 is an example network dataset for the Long Term Evolution (LTE) network standard that is stored in the WCD of FIGS. 1 and 2.

DESCRIPTION OF EXAMPLE EMBODIMENTS

Figure 1:
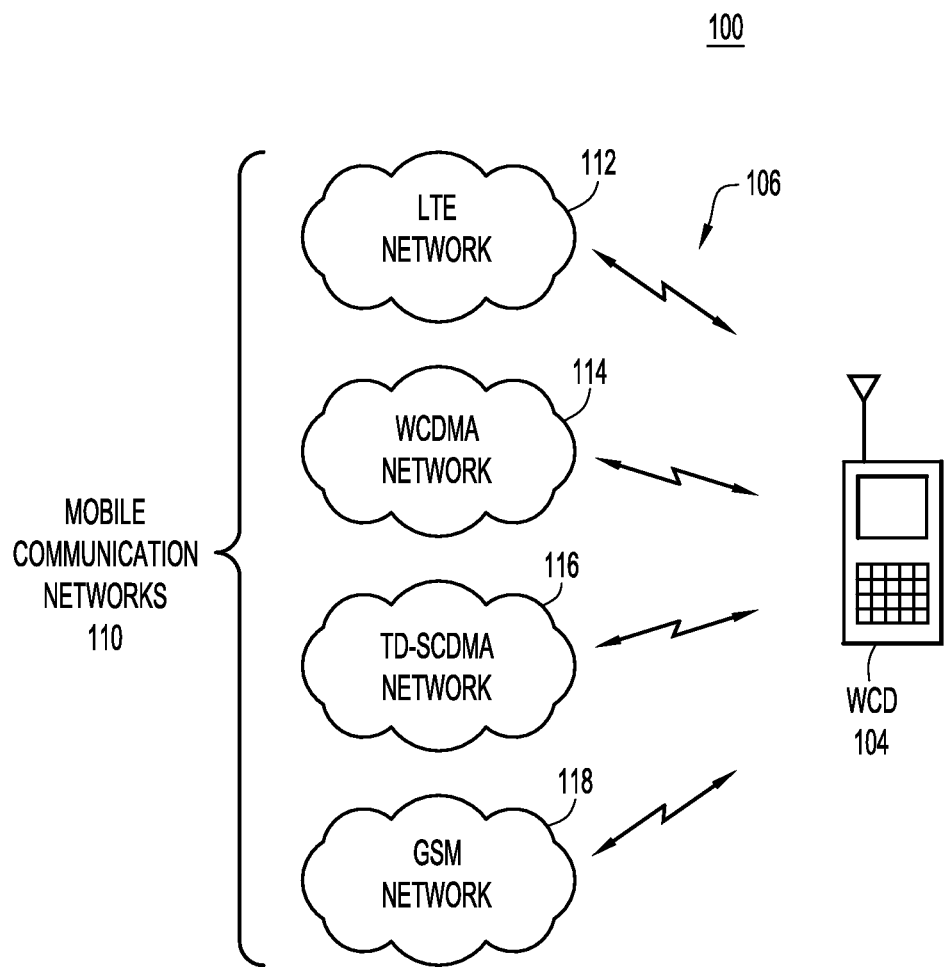
FIG. 1 is a diagram of an example mobile communication network environment in which a multimode network search may be implemented.

Embodiments are described herein in detail with reference to the accompanying drawings, wherein like reference numerals refer to like features throughout. The embodiments are intended as non-limiting examples. The figures described herein include schematic block diagrams illustrating various interoperating functional modules. Such diagrams are not intended to serve as electrical schematics and interconnections illustrated are intended to depict signal flow, various interoperations between functional components and/or processes and are not necessarily direct electrical connections between such components. Moreover, the functionality illustrated and described via separate components need not be distributed as shown, and the discrete blocks in the diagrams are not necessarily intended to depict discrete electrical components.

FIG. 1 is a diagram of an example mobile communication network environment 100 in which a multimode network search technique described herein may be implemented. Network environment 100 includes a WCD 104 configured to transmit/receive appropriately formatted wireless communication signals 106 to/from multiple mobile communication networks 110. Networks 110 operate according to different mobile communication air interface standards (also referred to as "modes" and "radio access types" ("RATs")). Some of networks 110 may cover overlapping geographical areas while others have geographically separated coverage areas. Communication networks 110 may include, for example:

a. a Long Term Evolution (LTE) network 112 that operates according to the LTE standard, such as 4G LTE;
b. a Wideband Code Division Multiplex (WCDMA) network 114 that operates according to the WCDMA or International Mobile Telecommunications-2000 (IMT-2000) standard;
c. a Time Division Synchronous Code Division Multiple Access (TD-SCDMA) network 116 that operates according to the TD-SCDMA standard; and
d. a Global System for Mobile Communications (GSM) network 118 that operates according to the GSM standard.

Communication networks 110 may also include networks that operate according to mobile communication standards (i.e., RATs) different from those depicted in FIG. 1.

To access communication services, WCD 104 must first search for or acquire an available one of networks 110 and, if a network is found, establish connectivity with the found network. The terms "search for" and "acquire" and their derivatives (such as "searching for" and "acquiring," etc.) are synonymous and used interchangeably herein. Each network, such as LTE network 112, typically supports WCD communication in many different frequency bands as defined in the relevant standard, where a frequency band is identified by ranges of frequencies over which the WCD and the network can perform transmission and reception. For each RAT, a set of carrier frequencies is specified by the wireless communication standard(s). Each carrier frequency consists of a center frequency and a frequency bandwidth aligned with the center frequency. In some RATs multiple bandwidths may be specified for the same carrier center frequency. Thus, to access the communication services, WCD 104 typically searches for network availability among the many different possible networks (e.g., networks 110) and, for each network, among different possible frequency bands and frequency carriers therein. The permutations and combinations of different networks and frequency bands translate to a large number of search hypotheses that may need to be searched by WCD 104 to find an available network.

Accordingly, WCD 104 implements an efficient, concurrent multimode (i.e., multi-RAT) network search technique to traverse the many possible search hypothesis quickly, and thereby reduce the time taken to find an available network. To do this, initially, WCD 104 records a signal received in an entire frequency band (or a large portion thereof) over a predetermined record time period, such as several milliseconds (ms). The predetermined record time period is sufficiently long to ensure that the recorded received signal would include several downlink signal frames from any available network, and wide enough in frequency to ensure that a large number of frequency carriers are contained within the recorded signal. As would be appreciated by one of ordinary skill in the relevant arts having read the present application, the aforementioned "signal" that is recorded may also be considered wide bandwidth energy (or a wide bandwidth energy spectrum) that is to be searched across the bandwidth for communication signals operating according to the different RATs. After the predetermined record time period, WCD 104 concurrently searches the recorded received signal (or a derivative representative metric thereof) for the presence of multiple communication signals each operating according to a corresponding one of multiple (different) RAT and possibly different frequencies. In other words, WCD 104 performs concurrent searches for the different networks that might be available based on the recorded received signal. In addition, WCD 104 may perform concurrent searches for a given network across different frequency bands/center frequencies, and over multiple candidate RATs. An advantage of this concurrent search technique is that a computer controller of WCD 104 may search for the different networks in parallel at a relatively fast controller processing speed (e.g., in the Gigahertz range) once the initial record time period of several milliseconds is over. The terms "concurrent" and "parallel" as used herein are synonymous.

Figure 2:
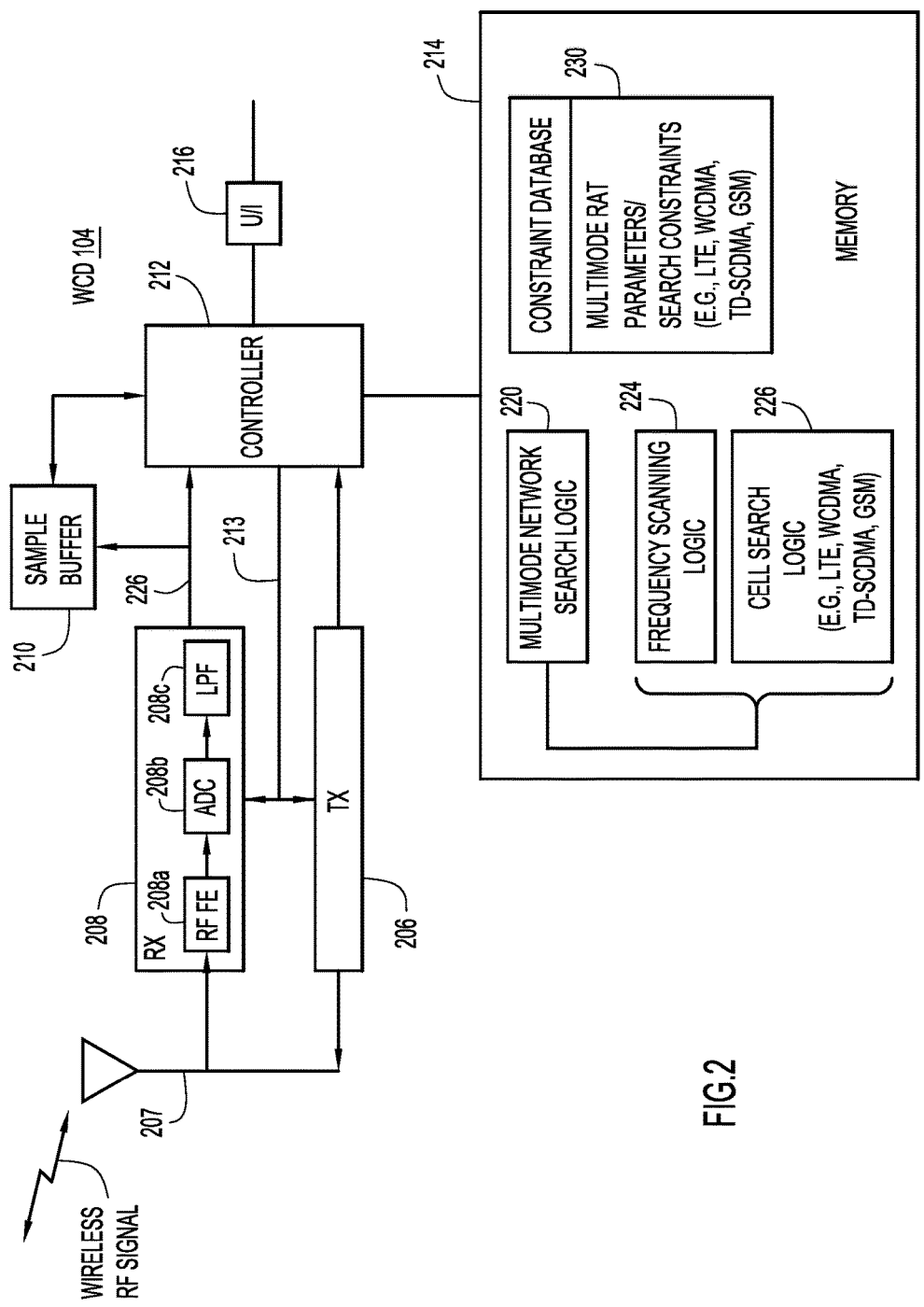
FIG. 2 is a block diagram of an example wireless communication device (WCD) configured to perform a multimode network search.

With reference to FIG. 2, there is depicted an example block diagram of WCD 104 configured to perform the multimode search technique summarized above and described in detail below. Examples of WCD 104 include but are not limited to smartphones, laptop computers, tablet computers, and so on. WCD 104 includes a wireless transmitter (TX) 206 to transmit wireless RF signals via an antenna 207, a wireless receiver (RX) 208 to receive a wideband wireless RF signal via the antenna, a sample buffer 210 to store digitized samples representative of the received RF signal, a controller 212 to control WCD 104 and perform the network search technique described herein, a controller memory 214 to store instructions and data used by the controller, and a user interface 216 to provide data to and receive data from a user or user applications (not shown in FIG. 2).

Controller 212 provides transmitter and receiver control signals 213 (e.g., dwell time control, center frequency tuning control, and frequency bandwidth control) to TX 206 and RX 208 to control the TX and RX so as to perform their respective operations described below.

RX 208 includes an RF front-end (FE) 208a to tune to a communication frequency band at which an RF signal is to be received (e.g., a frequency band having a center frequency of 2.1 GHz and a frequency bandwidth of 50 MHz), frequency-downconvert the received RF signal around the center frequency to a baseband signal at a baseband frequency (or a near baseband frequency), and provide the baseband (or near baseband) signal to an analog-to-digital converter (ADC) 208b. The aforementioned "RF signal" and "baseband signal" each refer to a relatively wideband signal that may encompass many RAT frequency bands. RX 208 may be configured to receive and process RF signals associated with mobile communication networks over a wide range of RF frequencies from, e.g., 200 Megahertz (MHz) to 2 or 3 GHz. TX 206 is configured to process and transmit RF frequencies over a frequency range similar to that of RX 208. Other receive and transmit frequency ranges are possible. Also, both TX 206 and RX 208 are configured to tune their respective transmit and receive frequencies in increments sufficiently fine as to be aligned with communication signals associated with the various networks, e.g., in 1 Kilohertz (KHz) increments or less.

ADC 208b digitizes, i.e., samples, the (wideband) baseband signal delivered from RF FE 208a to produce a sequence of samples representative of the received RF signal. ADC 208b samples the baseband signal at an effective sample rate sufficiently high, e.g., 250 MHz, to produce the samples with a frequency bandwidth sufficiently wide as to encompass the whole of or a significant portion of the frequency band of interest, such as a bandwidth in a range of 50-100 MHz. In an embodiment, ADC 208b produces quadrature samples, i.e., both I and Q samples that are 90° out-of-phase with respect to each other.

A LPF 208c low-pass filters the samples from ADC 208b according to a low pass frequency bandwidth of the LPF, to produce filtered samples 226 representative of the received RF signal. The LPF frequency bandwidth may be set according to a bandwidth control signal from controller 212 via control signals 213. Example frequency bandwidths may correspond to the frequency band of interest, such as 50, 25, 10, 5, 3, and 1.25 MHz. LPF 208c provides filtered samples 226 to sample buffer 210 and controller 212. Filtered samples 226 are referred to herein as "sampled signal" that is representative of the received RF signal. In another embodiment, LPF 208c may be omitted so as to avoid frequency-limiting a bandwidth associated with the samples from ADC 208b.

Sample buffer 210 includes sufficient storage space to store the samples 226 over a predetermined time period, such as 5 or 10 ms, although other time periods are possible. In other words, sample buffer 210 stores time segments of sampled signal representative of corresponding time segments of the received RF signal. The sampled signal may include both I and Q samples in the quadrature embodiment mentioned above. Sample buffer 210 may include any of a random access memory (RAM), magnetic disk storage media devices, optical storage media devices, flash memory devices, electrical, optical, or other memory storage devices.

Controller 212 is configured to perform the search techniques described herein based on the sampled signal stored in sample buffer 210. Controller 212 may include a digital baseband processor, such as a digital signal processor, to perform processing of communication signals on behalf of both TX 206 and RX 208, including, but not limited to, encoding/decoding, modulation/demodulation, and filtering. Controller 210 may also include a control processor to perform high-level control of WCD 104 and network search techniques. Controller 212 accesses the sampled signal in sample buffer 210 and computer instructions and data in memory 214.

Memory 214 may comprise read only memory (ROM), random access memory (RAM), magnetic disk storage media devices, optical storage media devices, flash memory devices, electrical, optical, or other physical/tangible (e.g., non-transitory) memory storage devices. Thus, in general, the memory 214 may comprise one or more computer readable storage media (e.g., a memory device) encoded with software comprising computer executable instructions and when the software is executed (by the controller 212) it is operable to perform the operations described herein. For example, memory 214 stores or is encoded with instructions for Multimode Network Search logic 220 to perform search techniques described herein. Multimode Network Search logic 220 may include (i) Frequency Scanning logic 224 to perform fast Fourier transforms (FFTs) and frequency-based received signal strength indication (RSSI) and analysis, and (ii) Network Cell Search logic 226 to perform concurrent mobile communication network cell searches for the different network RATs.

In addition, memory 214 stores data used and/or generated by logic 220, such as a RAT parameter/constraint database 230 that includes multimode RAT parameters and search constraints associated with the different network RATs, such as the LTE, the WCDMA, the TD-SCDMA, and the GSM RATs. Parameter/constraint database 230 may include a separate RAT dataset for each of the different RATs. Each RAT dataset lists the various parameters associated with the given RAT, such as the frequency bands and sub-bands, various operating bandwidths, duplex modes, etc. An example LTE dataset is shown in FIG. 7.

Figure 3:
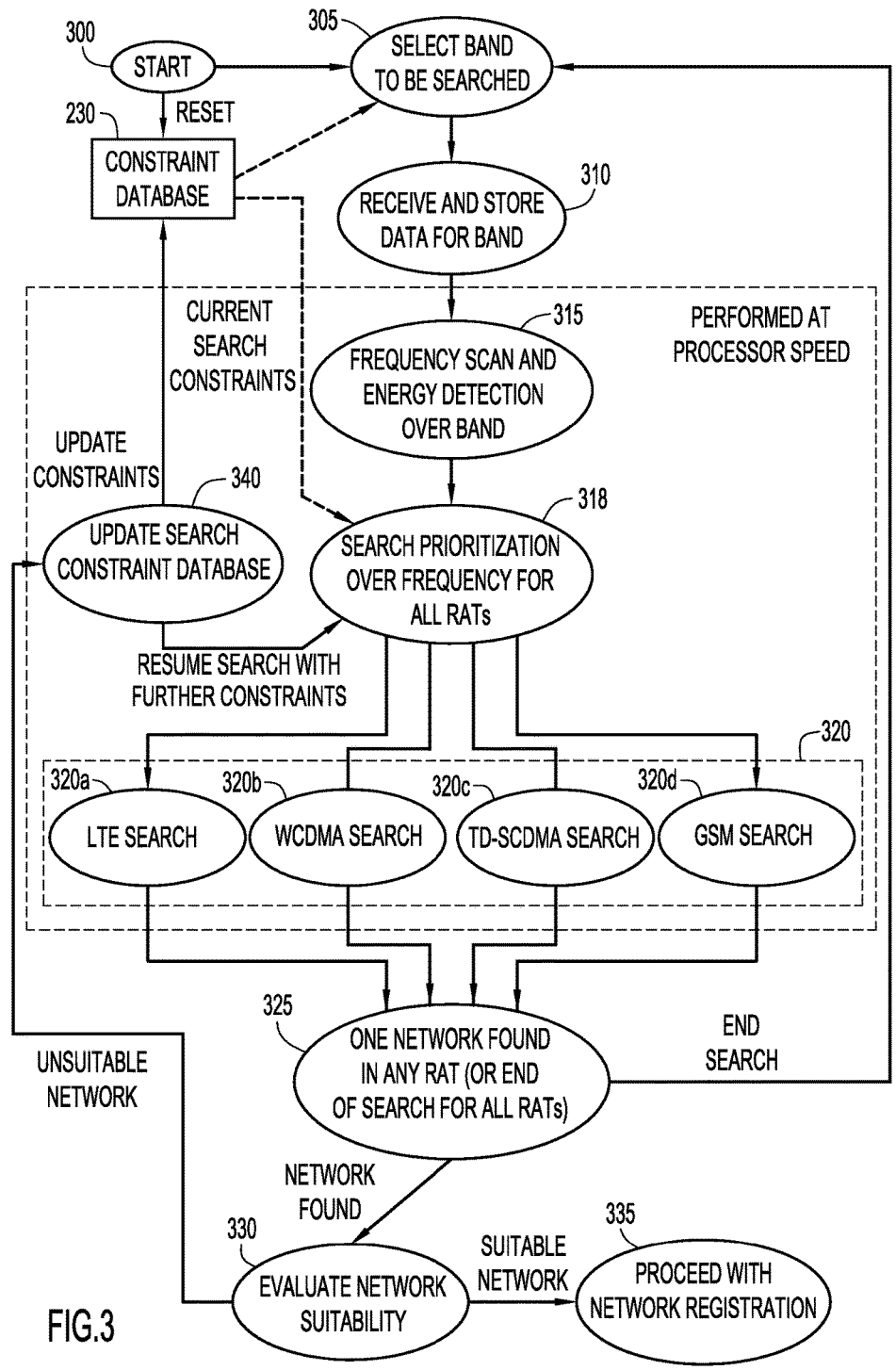
FIG. 3 is a flowchart of an example method of performing a multimode network search for different communication networks.

With reference to FIG. 3, there is depicted a flowchart of an example method 300 of performing a multimode network search performed in WCD 100 under control of controller 212. Controller 212 executes logic 220 to perform method 300.

At 305, controller 212 selects a frequency band of interest to be searched for active, available communication networks. Since RATs often define both frequency bands and sub-bands, the term "frequency band" as used herein refers generally to both "frequency band" and "frequency sub-band." RX 208 tunes to the selected frequency band, for example, to a frequency band centered at 2.1 GHz and having a bandwidth in a range of 20-50 MHz. Also, the frequency bandwidth of LPF 208c is configured as appropriate for the selected frequency band. RX 208 receives wireless RF signal in the selected frequency band. In an embodiment of RX 208 in which LPF 208c is omitted, RX 208 captures signal over a much wider frequency bandwidth, e.g., up to 1 GHz.

At 310, controller 212 causes sample buffer 210 to store samples 226 over a predetermined time period, such as 5 to 10 ms, although longer or shorter times as possible. The samples stored in sample buffer 210, i.e., the sampled signal (or sampled energy spectrum), represent the received RF signal (or received RF energy spectrum). The time period is sufficiently long to capture several sequential frames of downlink signals of networks of interests. For example, the time period should be sufficiently long to capture 6 or 7 sequential Resource Blocks (RBs) in a downlink signal of the LTE RAT.

At next operations 315-340, controller 212 accesses the sampled signal representative of the RF signal stored in sample buffer 210 and the network parameter/constraint datasets in database 230 and processes the sampled signal based on the datasets to concurrently search for different RATs, as described below.

At 315, controller 212 converts the sampled signal from a time domain to a frequency domain using, e.g., an FFT, and performs an RSSI scan in the frequency domain. The RSSI scan detects energy levels at frequencies across the frequency domain.

At 318, controller 212 assigns priorities to the frequencies based on their respective detected energy levels. Frequencies having relatively higher and lower detected energy levels are assigned relatively higher and lower priorities, respectively. Controller 212 selects the higher priority frequencies, and assigns the selected frequencies each to a corresponding one of concurrent network search threads or signal processing channels used in next operation 320. In an embodiment, a single frequency having a highest detected energy level may be assigned to each of the search threads. In another embodiment, different frequencies may be assigned to different search threads. Also, at 318, controller 212 assigns to each of the search threads a corresponding RAT to be searched in that search thread.

At 320, controller 212 concurrently searches the sampled signal for multiple communication signals each operating according to a corresponding one of multiple, different RATs (assigned at 318). To do this, controller 212 concurrently executes (parallel) search threads 320a, 320b, 320c, and 320d each to search for a communication signal that operates, at the assigned one of the selected frequencies, according to a corresponding one of the LTE, WCDMA, TD-SCDMA, and GSM RATs, for example. Search threads 320a, 320b, 320c, and 320d each search for the corresponding communication signal (e.g., network downlink signal) within a frequency bandwidth (of the sampled signal) that is centered-around the assigned frequency. In an embodiment in which RX 208 captures signal over a wide bandwidth such as 1 GHz, the assigned frequency may be set equal to any frequency in the wide-bandwidth, e.g., at 1 MHz, 10 MHz, 500 MHz, 750 MHz, and so on. A given one of search threads 320a-320d may itself represent multiple concurrent search threads to concurrently search for an assigned network at multiple different frequencies. Search threads 320a, 320b, 320c, and 320d may be implemented as concurrent, separate signal processing channels, as describe below in connection with FIG. 4.

At 325, controller 212 determines whether a network was found at 320. If a network was not found, flow proceeds to 305 and the process repeats with a new selected frequency band. If a network was found, flow proceeds to 330.

At 330, controller 212 determines whether the found network is suitable by checking the broadcast information channel to ensure that the WCD is allowed to establish a connection with the network according to the relevant cell suitability criteria defined in each specific standard for a specific RAT. If the found network is suitable, flow proceeds to 335.

At 335, controller 212 causes WCD 104 to connect and register with the found network, after which the WCD may wirelessly access mobile communication services through the found network. To connect and register with the found network, TX 306 transmits appropriately formatted uplink signals to and RX 308 receives downlink signals from the found network.

If it was determined that the found network was not suitable at 330, flow proceeds to 340. At 340, controller 212 updates network constraints/parameter database 230 to indicate the unsuitability of the found network or unsuitability of certain features of the found network. For example, the RAT dataset in database 230 corresponding to the RAT determined to be unsuitable at 330 may be updated to reflect that the frequency carrier selected at 305 in the RAT is not available (as determined at 330), but the other frequency bands are still available for search. From 340, flow proceeds to 318 for a search reprioritization based on the updated database 230.

The above described process repeats over time.

Figure 4:
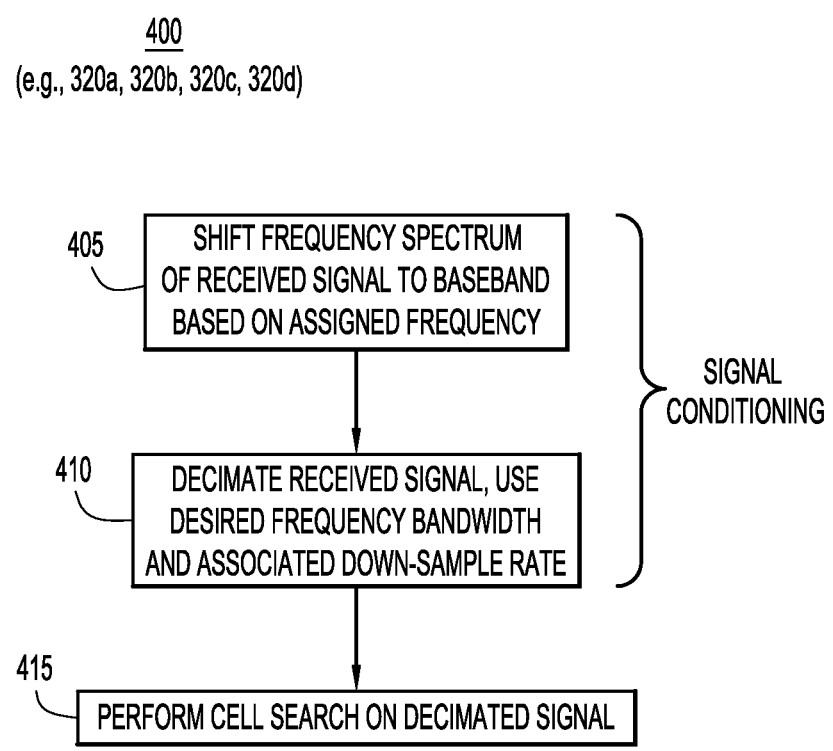
FIG. 4 is a flowchart of operations expanding on concurrent search operations performed in the method of FIG. 3.

With reference to FIG. 4, there is depicted a sequence of operations 400 expanding on and representative of any one of search threads 320a, 320b, 320c, and 320d. Collectively, operations 400 also represent a digital signal processing channel (corresponding to any of search threads 320a-320d) that processes the sampled signal in sequential stages to search for a given RAT. As mentioned above, at operation 318, a selected frequency and a selected RAT to be searched are assigned to search thread operation 400.

At 405, controller 212 frequency-shifts, e.g., frequency mixes, a frequency spectrum of the sampled signal to a baseband frequency (e.g., zero Hz) if the assigned center frequency is offset from the baseband frequency. This enables each search thread to tune-to/cover a different portion of the selected frequency band to which RX 208 tuned-to in operation 305 and represented in the frequency spectrum/domain produced by the FFT in operation 315. For example, a first search thread may frequency-shift the frequency spectrum by a first assigned frequency, a second search thread may frequency-shift the frequency spectrum by a second assigned frequency, and so on across the multiple search threads. An example of this will be discussed below in connection with FIGS. 5 and 6.

At 410, controller 212 decimates the sampled signal, i.e., (i) low pass filters the sampled signal with a low pass frequency bandwidth suitable for purposes of anti-aliasing and capturing a bandwidth of a downlink signal of interest, and (ii) down-samples the low pass filtered, sampled signal. Operation 410 produces decimated samples.

Operations 405 and 410 collectively represent a channel signal conditioning operation in which controller 212 conditions the sampled signal prior to operation 415, described below.

At 415, controller 212 performs a network cell search on the decimated samples according to the assigned RAT. The cell search is a basic function in a mobile communication system in which time and frequency synchronization between the WCD and the mobile communication network is achieved. Typically, the WCD acquires time and frequency synchronization by processing a downlink synchronization channel from the mobile communication network. For example, for LTE, a network cell search includes the following high-level operations based on processing of network downlink frames recorded in the received signal: detecting symbol timing and a frequency offset; detecting a cell identifier (ID) group, frame timing, and other cell specific information; and detecting a cell ID from downlink reference signals. Generally, any heretofore known or hereafter developed network cell search technique may be used for the cell search, as would be appreciated by one of ordinary skill in the relevant arts after having read the present description.

Figure 5:
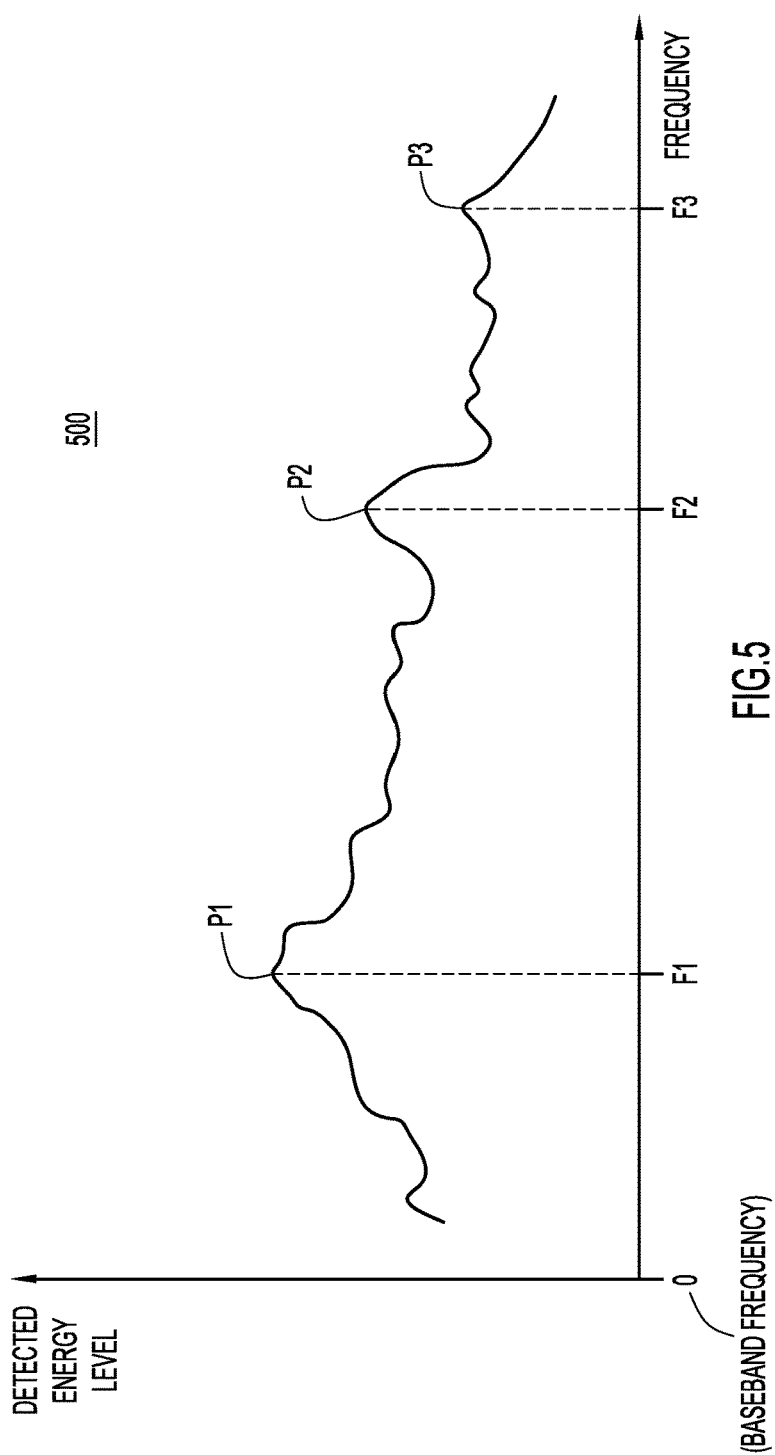
FIG. 5 is a graph of an example frequency spectrum (i.e., frequency domain plot) of a sampled signal that is produced in the method of FIG. 3.
Figure 6:
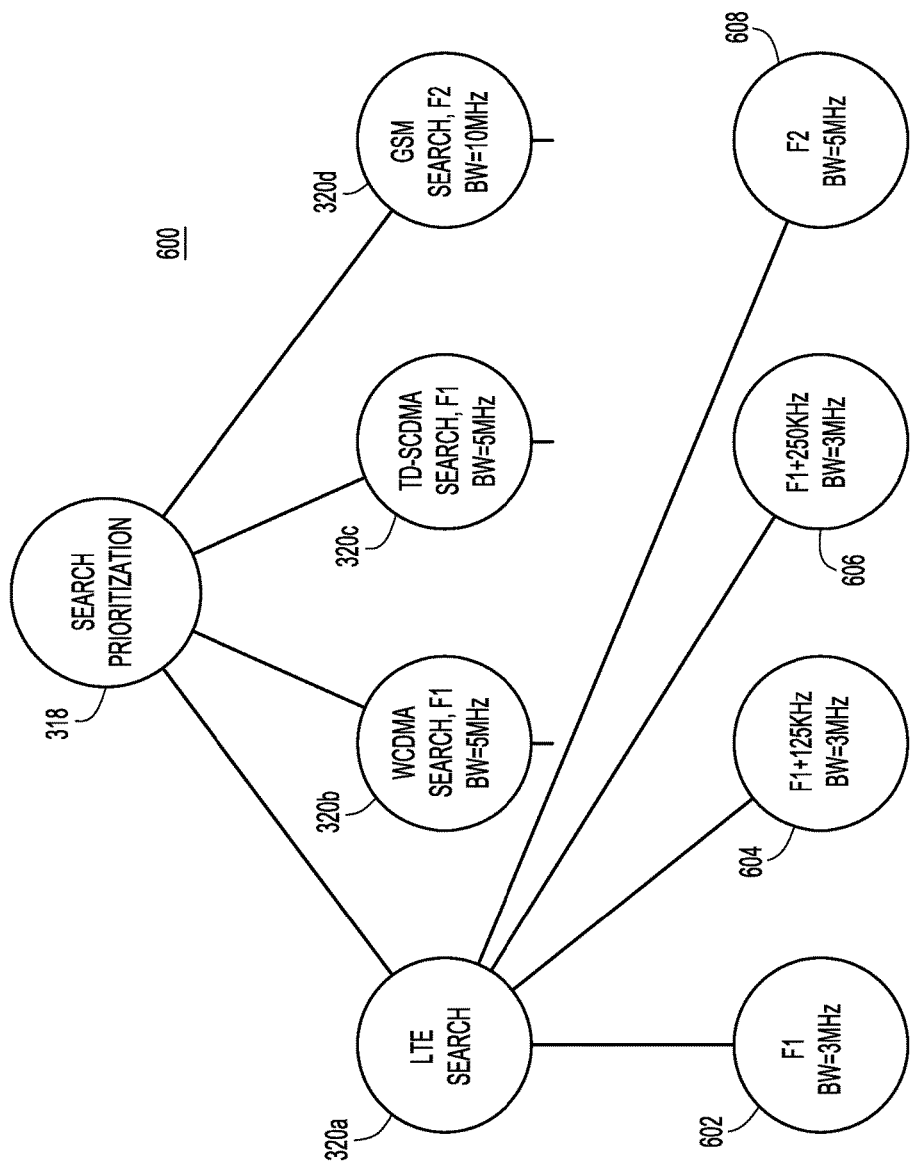
FIG. 6 is a flowchart excerpt from FIG. 3 showing a prioritization operation and various concurrent search threads annotated to include respective assigned search parameters.

FIGS. 5 and 6 collectively represent an example of a search strategy implemented in method 300. FIG. 5 is a graph of an example FFT frequency spectrum 500 (i.e., frequency domain plot) of the sampled signal produced by an FFT operation at 315. Note that the frequencies represented in frequency spectrum 500 are frequency down-converted from corresponding RF frequencies by RX 208. FIG. 6 is an excerpt of the flowchart in FIG. 3 that shows prioritization operation 318 and various concurrent search threads 320a-320d and 602-608 each annotated with assigned search parameters, including a respective center frequency (CF) from FIG. 5, and a frequency bandwidth (BW) associated with the assigned CF.

With reference to FIG. 5, prioritization operation 318 assigns descending priorities P1, P2, and P3 to center frequencies F1, F2, and F3 of spectrum 500 in accordance with detected energies of the frequencies. Then, operation 318 assigns various ones of CFs F1, F2, and F3 and corresponding BWs to corresponding ones of the concurrent search threads depicted in FIG. 6 based on priorities P1, P2, and P3 and bandwidth information from network datasets in database 230. With reference to FIG. 6, search parameters CF and BW are assigned to each of the concurrent search threads, as follows:

a. WCDMA search 320b: CF F1 and BW=5 MHz;
b. TD-SCDMA search 320c: CF F1 and BW=5 MHz;
c. GSM search 320d: CF F2 and BW=10 MHz; and
d. LTE search 320a is divided into multiple concurrent search threads 602-608 each assigned to perform a respective LTE cell search based on the following parameters that account for a 125 KHz raster on the center frequency and different bandwidths defined in the LTE standard.
   i. LTE search 602: CF F1 and BW=3 MHz;
   ii. LTE search 604: CF=F1+125 KHz and BW=3 MHz;
   iii. LTE search 606: CF=F1+250 KHz and BW=3 MHz; and
   iv. LTE search 608: CF=F1+375 KHz and BW=5 MHz.

Each of the above listed search threads may be implemented as a separate signal processing channel similar to channel 400 described above in connection with FIG. 4.

Many other search variations are possible beyond those depicted in FIG. 6. As can be seen in the example of FIGS. 5 and 6, different RATs, center frequencies, and bandwidths may be searched concurrently by controller 212 based on a single recorded segment of the received signal.

With reference to FIG. 7, there is depicted an example LTE dataset 700 stored in database 230. A similar dataset may be stored for each of the different RATs, as described above.

A method embodiment comprises: sampling a signal (or sampling an energy spectrum) received wirelessly over a predetermined time period; after the predetermined period, concurrently searching the sampled signal (or energy spectrum) for multiple communication signals each operating according to a corresponding one of multiple, different mobile communication standards; and if one of the communication signals is found, attempting to connect wirelessly with a communication network from which the found communication signal originates.

An apparatus embodiment comprises: a wireless transceiver to wirelessly receive and transmit radio frequency (RF) signals and sample a signal representative of the received RF signal over a predetermined time period; a memory to store the sampled signal; and a processor, coupled to the wireless transceiver and the memory, configured to: after the predetermined period, concurrently search the sampled signal for multiple communication signals each operating according to a corresponding one of multiple, different mobile communication standards; and if one of the communication signals is found, attempt to connect wirelessly with a communication network from which the found communication signal originates.

The descriptions above are intended to illustrate possible implementations of the present inventive concept and are not restrictive. Many variations, modifications and alternatives will become apparent to the skilled artisan upon review of this disclosure. For example, components equivalent to those shown and described may be substituted therefore, elements and methods individually described may be combined, and elements described as discrete may be distributed across many components. The scope of the invention should therefore be determined not with reference to the description above, but with reference to the appended claims, along with their full range of equivalents.

What is claimed is:

1. A method performed by a wireless communication device, comprising:
    wirelessly receiving a signal via an antenna;
    sampling the signal received via the antenna over a predetermined time period;
    detecting energy levels at frequencies across a frequency domain of the sampled signal;
    assigning priorities to the frequencies based on the detected energy levels;
    selecting a frequency having a relatively highest priority among the frequencies;
    assigning to each of multiple network search threads a respective set of search parameters, including a respective one of the frequencies selected based on the priorities, a respective bandwidth coinciding with the respective selected frequency, and a respective one of multiple, different mobile communication standards;
    concurrently searching the sampled signal for multiple communication signals each operating according to a corresponding one of the multiple, different mobile communication standards, wherein the concurrently searching includes concurrently executing the network search threads such that each network search thread performs searching, concurrently with the other network search threads, the sampled signal according to the respective set of search parameters; and
    if one of the communication signals is found, attempting to connect wirelessly with a communication network from which the found communication signal, operating according to the corresponding one of the multiple, different mobile communication standards, originates.

2. The method of claim 1, wherein the concurrently searching further includes concurrently searching the sampled signal for multiple additional communication signals each operating according to a same mobile communication standard.

3. The method of claim 1, further comprising performing a fast Fourier transform (FFT) to convert the sampled signal to the frequency domain.

4. The method of claim 1, wherein the concurrently searching includes concurrently processing the sampled signal in multiple separate signal processing channels corresponding to the network search threads, each of the channels to process the sampled signal therein according to an assigned one or more of the multiple mobile communication standards and an assigned one of the selected frequencies.

5. The method of claim 4, wherein the concurrently processing includes, in each signal processing channel:
    frequency-mixing the sampled signal to a baseband frequency if the selected frequency assigned to the channel is offset from the baseband frequency;
    decimating the sampled signal according to a frequency bandwidth defined in the mobile communication standard assigned to the channel; and
    performing a mobile communication network cell search on the decimated signal according to the mobile communication standard assigned to the channel.

6. The method of claim 4, wherein the performing the multiple mobile communication network cell searches includes performing each of the multiple cell searches in accordance with a corresponding one of the Long Term Evolution (LTE) mobile communication standard, a Wideband Code Division Multiple Access (WCDMA) mobile communication standard, and the Global System for Mobile Communications (GSM) mobile communication standard.

7. The method of claim 1, wherein the concurrently searching includes concurrently searching the sampled signal for multiple communication signals each operating according to a corresponding one of the Long Term Evolution (LTE) mobile communication standard, a Wideband Code Division Multiple Access (WCDMA) mobile communication standard, and the Global System for Mobile Communications (GSM) mobile communication standard.

8. The method of claim 1, wherein:
    the selecting a frequency further includes selecting multiple, different frequencies having relatively highest priorities among the frequencies;
    the assigning to each of multiple network search threads includes assigning to each of the multiple network search threads a respective one of the selected different frequencies, the respective bandwidth, and the respective one of the multiple, different mobile communication standards; and
    the concurrently executing includes concurrently executing the network search threads such that each network search thread searches for the respective one of the multiple, different mobile communication standards at the respective one of the different frequencies.

9. An apparatus comprising:
    a wireless transceiver including an antenna to wirelessly receive radio frequency (RF) signals and sample a signal representative of the received RF signal from the antenna over a predetermined time period;
    a memory to store the sampled signal; and
    a processor, coupled to the wireless transceiver and the memory, configured to:
        detect energy levels at frequencies across a frequency domain of the sampled signal;
        assign priorities to the frequencies based on the detected energy levels;
        select a frequency having a relatively highest priority among the frequencies;
        assign to each of multiple network search threads a respective set of search parameters, including a respective one of the frequencies selected based on the priorities, a respective bandwidth coinciding with the respective selected frequency, and a respective one of multiple, different mobile communication standards;

concurrently search the sampled signal for multiple communication signals each operating according to a corresponding one of multiple, different mobile communication standards, wherein the processor is configured to concurrently search by concurrently executing the network search threads such that each network search thread searches, concurrently with the other network search threads, the sampled signal according to the respective set of search parameters; and if one of the communication signals is found, attempt to connect wirelessly with a communication network from which the found communication signal, operating according to the corresponding one of the multiple, different mobile communication standards, originates.

10. The apparatus of claim 9, wherein the processor is further configured to concurrently search by concurrently searching the sampled signal for multiple additional communication signals each operating according to a same mobile communication standard.

11. The apparatus of claim 9, wherein the processor is further configured to perform a fast Fourier transform (FFT) to convert the sampled signal to the frequency domain.

12. The apparatus of claim 9, wherein the processor is further configured to concurrently search by concurrently processing the sampled signal in multiple separate signal processing channels corresponding to the network search threads, each of the channels to process the sampled signal therein according to an assigned one or more of the multiple mobile communication standards and an assigned one of the selected frequencies.

13. The apparatus of claim 12, wherein the processor is further configured to concurrently process the sampled signal in each signal processing channel by:
frequency-mixing the sampled signal to a baseband frequency if the selected frequency assigned to the channel is offset from the baseband frequency;
decimating the sampled signal according to a frequency bandwidth defined in the mobile communication standard assigned to the channel; and
performing a mobile communication network cell search on the decimated signal according to the mobile communication standard assigned to the channel.

14. The apparatus of claim 12, wherein the processor is further configured to perform the multiple mobile communication network cell searches by performing each of the multiple cell searches in accordance with a corresponding one of the Long Term Evolution (LTE) mobile communication standard, a Wideband Code Division Multiple Access (WCDMA) mobile communication standard, and the Global System for Mobile Communications (GSM) mobile communication standard.

15. The apparatus of claim 12, wherein the processor is further configured to concurrently search by concurrently searching the sampled signal for multiple communication signals each operating according to a corresponding one of the Long Term Evolution (LTE) mobile communication standard, a Wideband Code Division Multiple Access (WCDMA) mobile communication standard, and the Global System for Mobile Communications (GSM) mobile communication standard.

16. The apparatus of claim 9, wherein the predetermined time period is in the range of four to ten milliseconds.

17. The apparatus of claim 9, wherein the processor is configure to:
select by selecting multiple, different frequencies having relatively highest priorities among the frequencies;
assign to each of multiple network search threads by assigning to each of the multiple network search threads a respective one of the selected different frequencies, the respective bandwidth, and the respective one of the multiple, different mobile communication standards; and
concurrently execute by concurrently executing the network search threads such that each network search thread searches for the respective one of the multiple, different mobile communication standards at the respective one of the different frequencies.

18. A non-transitory tangible processor readable medium storing instructions that, when executed by a processor of a wireless communication device, cause the processor to:
access sampled signal representative of radio frequency (RF) signal received wirelessly from an antenna over a predetermined time period;
detect energy levels at frequencies across a frequency domain of the sampled signal;
assign priorities to the frequencies based on the detected energy levels;
select a frequency having a relatively highest priority among the frequencies;
assign to each of multiple network search threads a respective set of search parameters, including a respective one of the frequencies selected based on the priorities, a respective bandwidth coinciding with the respective selected frequency, and a respective one of multiple, different mobile communication standards;
concurrently search the sampled signal for multiple communication signals each operating according to a corresponding one of multiple, different mobile communication standards, wherein the processor is configured to concurrently search by concurrently executing the network search threads such that each network search thread searches, concurrently with the other network search threads, the sampled signal according to the respective set of search parameters; and
if one of the communication signals is found, attempt to connect wirelessly with a communication network from which the found communication signal, operating according to the corresponding one of the multiple, different mobile communication standards, originates.

19. The processor readable medium of claim 18, wherein the concurrently searching further includes concurrently searching the sampled signal for multiple additional communication signals each operating according to a same mobile communication standard over multiple frequency bands.

20. The processor readable medium of claim 18, wherein:
the instructions to cause the processor to select a frequency further include instructions to cause the processor to select multiple, different frequencies having relatively highest priorities among the frequencies;
the instructions to cause the processor to assign to each of multiple network search threads include instructions to cause the processor to assign to each of the multiple network search threads a respective one of the selected different frequencies, the respective bandwidth, and the respective one of the multiple, different mobile communication standards; and
the instructions to cause the processor to concurrently execute include instructions to cause the processor to concurrently execute the network search threads such that each network search thread searches for the respective one of the multiple, different mobile communication standards at the respective one of the different frequencies.

\* \* \* \* \*